United States Patent
Schmidl et al.

(10) Patent No.: US 6,970,440 B1
(45) Date of Patent: Nov. 29, 2005

(54) ENHANCED PERFORMANCE IN FREQUENCY HOPPING WIRELESS COMMUNICATIONS BY COMBINING FREQUENCY DWELLING WITH DATA TRANSMISSION ADJUSTMENTS

(75) Inventors: Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 658 days.

(21) Appl. No.: 09/633,945

(22) Filed: Aug. 8, 2000

Related U.S. Application Data

(60) Provisional application No. 60/185,782, filed on Feb. 29, 2000.

(51) Int. Cl.[7] ............................................... H04Q 7/00
(52) U.S. Cl. ..................................... 370/330; 375/132
(58) Field of Search ............................. 370/343, 338, 370/465, 468, 330, 345, 442; 375/132

(56) References Cited

U.S. PATENT DOCUMENTS 5,490,168 A * 2/1996 Phillips et al. .............. 375/224
6,130,905 A * 10/2000 Wakayama .................. 375/132
6,650,630 B1 * 11/2003 Haartsen ..................... 370/345

OTHER PUBLICATIONS

"Networks for Homes", Amitava Dutta-Roy, IEEE Spectrum, Dec. 1999, pp. 26-33.

* cited by examiner

Primary Examiner—Man U. Phan
Assistant Examiner—Toan Nguyen
(74) Attorney, Agent, or Firm—Ronald O. Neerings; Wade James Brady, III; Frederick J. Telecky, Jr.

(57) ABSTRACT

In wireless communications between first and second frequency hopping wireless communication devices, both devices can dwell on a single selected frequency ($f_{11}$) for selected types of data transmissions such as large data bursts and data requiring an enhanced quality of service. For a large data burst, the data transmission rate can also be increased (DH5) during the duration ($T_i$) of the frequency dwelling, thereby reducing the transmission time of the burst. In addition, the combination of frequency dwelling with an increased data transmission rate can advantageously be used to free time slots in a wireless communication link between the devices, which freed time slots would not otherwise be available.

36 Claims, 4 Drawing Sheets

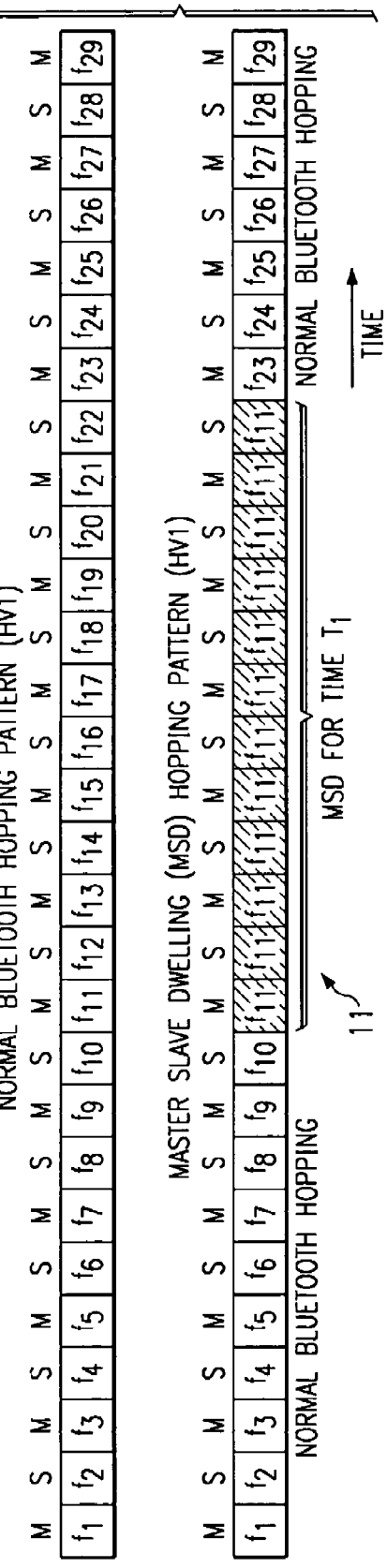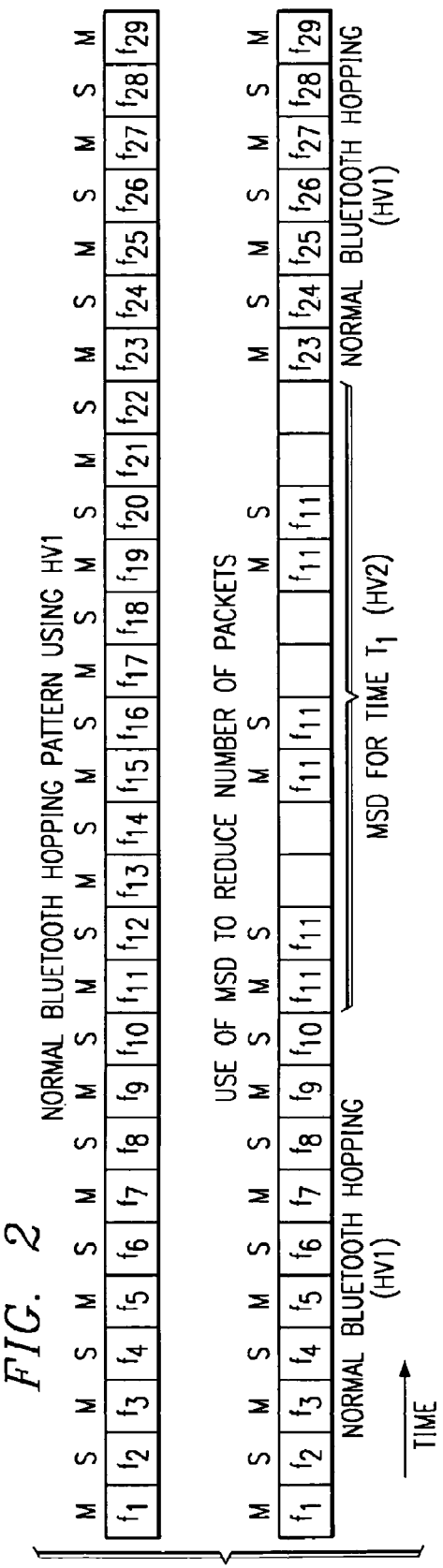

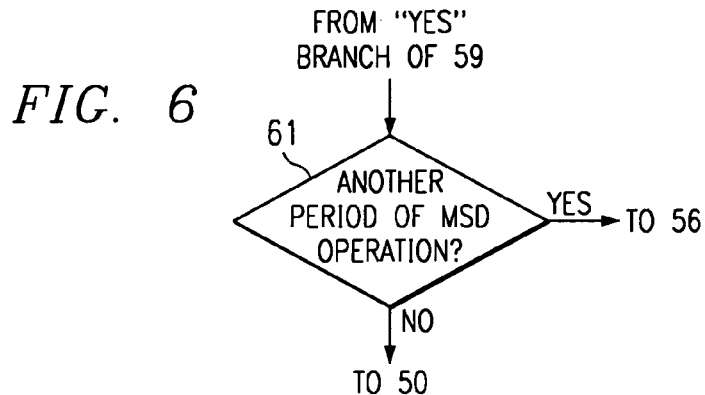
FIG. 6
FIG. 7
| REASON FOR MSD REQUEST | DATA TRANSMISSION METHOD | |
|---|---|---|
| | MSD | NON-MSD |
| LARGE DATA TRANSFER | DH5 | DM3 |
| | DH3 | DM3 |
| | DM5 | DM3 |
| ADDITIONAL COMMUNICATION ACTIVITY DESIRED | HV2 | HV1 |
| ENHANCED QoS DESIRED | SAME AS NON-MSD | SAME AS MSD |
| ENHANCED QoS DESIRED | LOWER CODING RATE | HIGHER CODING RATE |
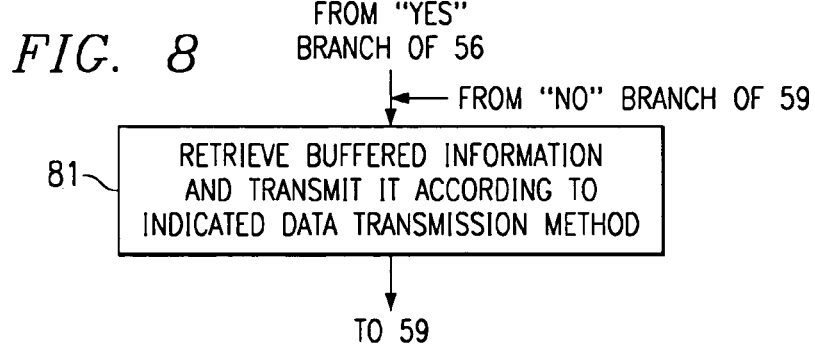
FIG. 8

ENHANCED PERFORMANCE IN FREQUENCY HOPPING WIRELESS COMMUNICATIONS BY COMBINING FREQUENCY DWELLING WITH DATA TRANSMISSION ADJUSTMENTS

This application claims the priority under 35 U.S.C. 119(e)(1) of copending U.S. provisional application No. 60/185,782, filed on Feb. 29, 2000.

FIELD OF THE INVENTION

The invention relates generally to wireless communications and, more particularly, to wireless communications that employ frequency hopping techniques.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. Id. pg. 31. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHZ channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In conjunction with frequency hopping systems such as the Bluetooth system, master-slave frequency dwelling (MSD) has been presented as a way of increasing the range in a Bluetooth system when the Doppler frequency is very low. The basic idea is to exploit the frequency diversity of the ISM bands by dwelling on good frequencies that are not currently in a fade. This can extend the operational range of the system by a factor of 3. Such master-slave dwelling techniques are disclosed in copending U.S. Ser. No. 09/507,134 filed on Feb. 22, 2000, incorporated herein by reference.

The aforementioned master-slave frequency dwelling technique is illustrated generally in the Bluetooth example of FIG. 1. MSD is used during the period of time indicated at 11. During this period of time (of length $T_i$), communications between the master and slave devices are conducted on a single, predetermined dwell frequency. Outside of the MSD time period 11, the frequencies of the normal Bluetooth frequency hopping pattern are used.

In many packet data applications, for example packet data applications in Bluetooth systems, the data will come in large bursts, for example images to download from a digital camera, transmission of a data file, Internet browsing, etc. In many of these situations, the user must wait for a considerable period of time before the entire data transmission is completed. For example, when transmitting a 1 megabyte file with a ⅔ rate code using 3-slot Bluetooth packets (e.g., Bluetooth DM3 packets with 121 information bytes per packet) where the master and slave alternate transmissions (and the acknowledgment takes a single-slot packet) the complete transmission will take about 22 seconds.

In other applications such as Bluetooth HV1 (High-quality Voice) where the voice transmission is protected by a ⅓ rate FEC (forward error correcting code) so that the master and slave each send an HV1 packet every 2 time slots, a single HV1 voice call disadvantageously occupies all of the available time slots.

In any packet communication system, some packets are more important than others, so different packets can have different quality-of-service requirements. In Bluetooth systems, for example, different coding rates are available for voice (rates of ⅓, ⅔ and 1) and for data (rates of ⅔ and 1), so some differentiation in quality-of-service is already possible. One problem, however, is that there is no additional coding across frequencies, so a packet may be lost during a fade, no matter what coding rate is used. Another problem is that using a ⅓ or ⅔ rate code disadvantageously decreases the information rates significantly. Retransmissions, for example using conventional ARQ techniques, are useful for packets that can tolerate the extra delay, but this also disadvantageously reduces the information rate.

It is desirable in view of the foregoing discussion to provide for reducing data transmission times for large data bursts, temporarily freeing time slots in applications which otherwise use all available time slots, and enhancing the quality-of-service for selected packets without decreasing the associated information rate.

The present invention uses master-slave frequency dwelling for selected types of data transmissions such as large data bursts and data requiring an enhanced quality of service. For a large data burst, master-slave frequency dwelling can be combined with an increase in the data transmission rate advantageously to reduce the transmission time of the burst. Also according to the present invention, master-slave frequency dwelling can be combined with an increased data transmission rate advantageously to free time slots which would not otherwise be available.

BRIEF DESCRIPTION OF THE DRAWINGS

FIG. 1 diagrammatically illustrates master-slave frequency dwelling as utilized by the present invention.

FIG. 2 diagrammatically illustrates an example of how the present invention can, during a period of master-slave frequency dwelling, free time slots which would otherwise be unavailable.

FIG. 6 illustrates further exemplary operations which can be performed by the wireless communication transceiver of FIGS. 3 and 4.

FIG. 7 illustrates examples of how the present invention can change the method of data transmission during a period of master-slave frequency dwelling.

FIG. 8 illustrates further exemplary operations which can be performed by the wireless communication transceiver of FIGS. 3 and 4.

DETAILED DESCRIPTION

Figure 3:
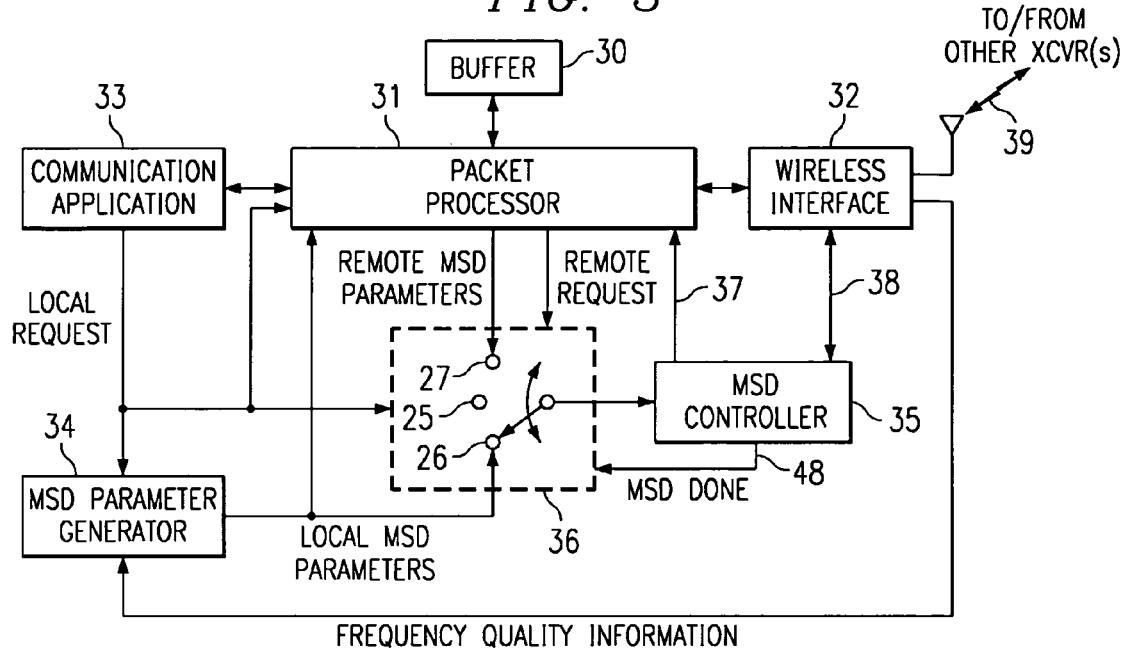
FIG. 3 illustrates pertinent portions of exemplary embodiments of a wireless communication transceiver according to the invention.

The present invention recognizes that the master-slave frequency dwelling (MSD) technique illustrated in FIG. 1 can provide signal-to-noise ratios (SNRs) that are higher than the signal-to-noise ratios associated with normal frequency hopping operation. Exemplary embodiments of the present invention exploit these higher SNRs to enhance the operation of frequency hopping wireless communication transceivers, for example Bluetooth master and slave devices.

According to one exemplary embodiment of the present invention, the aforementioned use of a ⅔ rate code with Bluetooth DM3 packets to transmit a 1 megabyte file in 22 seconds can be improved upon. If the channel is known to be good, for example, due to master-slave dwelling on a frequency which is currently known to have a high signal-to-noise ratio, then the 1 megabyte file could be transferred with Bluetooth DH5 packets, which cover 5 time slots with no forward error correction. Using the DH5 packets during MSD, the 1 megabyte file transfer would take about 12 seconds rather than the 22 second transmission time associated with the DM3 packets and the associated ⅔ rate code. Thus, the transmission time of any large data burst, for example transmitting an image or images from a digital camera, bringing up an Internet web page, or transmitting any large data file, can be reduced. In some situations, this inventive technique of changing the data transmission method during a period of master-slave frequency dwelling can reduce from 6 seconds to 3 seconds the time required to bring up an Internet web page.

Although the aforementioned example of changing from DM3 packets to DH5 packets during MSD achieves an increased data transmission rate by increasing both the coding rate and the length of the packets, increased transmission rates can also be achieved by increasing either the coding rate or the packet length (not necessarily both) during MSD. As one example of increasing the data transmission rate by increasing only the coding rate, DM3 packets could be replaced by higher coding rate DH3 packets during MSD. As one example of increasing the data transmission rate by increasing only the packet length, DM3 packets could be replaced by longer DM5 packets during MSD.

According to other embodiments of the invention, an increased coding rate can be employed during periods of master-slave frequency dwelling in order to free time slots which would otherwise be unavailable. For example, a Bluetooth voice application that uses HV1 packets also utilizes a ⅓ coding rate. Consequently, both the master device and the slave device must send an HV1 packet every 2 time slots. Accordingly, during a voice application that uses HV1 packets, there are no idle time slots for other communication tasks, for example monitoring other piconets. According to the present invention, however, a good frequency can be identified for master-slave dwelling, and Bluetooth HV2 packets can be utilized during the MSD period. Because the HV2 packets have a higher coding rate than the HV1 packets, the master device and the slave device each send an HV2 packet every 4 time slots. This is illustrated in exemplary FIG. 2. As shown in FIG. 2, MSD begins at frequency $f_{11}$ and lasts for $T_t=12$ time slots. Because the frequency $f_{11}$ is known to be a good frequency, the HV2 packets can be used instead of the lower coding rate HV1 packets, thereby leaving half of the time slots unused during MSD. These unused time slots can then be used for other communication activities, for example, the master communicating with other slave devices. In this example, as above, the data transmission rate is increased due to the higher coding rate of the HV2 packets, but here the increased data transmission rate is used to permit additional communication capabilities.

According to further exemplary embodiments of the invention, packets which have a relatively high quality-of-service requirement can be transmitted during periods of master-slave frequency dwelling. Once again, the relatively higher signal-to-noise ratio, which can be expected when dwelling on a known good frequency, can provide an increased quality of service for packets which require such treatment. The quality of service can also be increased even further by lowering the coding rate (thus lowering the data transmission rate) during master-slave frequency dwelling. Advantageously, this use of MSD to provide a higher quality of service can be effective even when applied to packets that are sensitive to delays.

FIG. 3 diagrammatically illustrates pertinent portions of exemplary embodiments of a frequency hopping wireless communications transceiver according to the present invention. For example, the transceiver of FIG. 3 could be a Bluetooth master device such as described above or a Bluetooth slave device such as described above. Other examples of the transceiver include CD players and personal digital assistants. The transceiver of FIG. 3 includes a packet processor 31 coupled between a wireless communications interface 32 and a communications application 33. The communications application provides communication information to the packet processor 31, which can use well-known conventional techniques to assemble packets suitable for communication of the information received from the communications application. The assembled packets are then forwarded to the wireless communications interface 32, which can use well-known conventional wireless communication techniques to transmit the packets across a wireless communication link 39 (for example a Bluetooth radio link) to another transceiver (or to a plurality of other transceivers) having features generally similar to those of the transceiver of FIG. 3. Similarly, the wireless communications interface 32 can receive packets from another transceiver (or transceivers) via the wireless communication link 39, again using well-known conventional techniques, and can forward the received packets to the packet processor 31. The packet processor 31 can use conventional techniques to disassemble the received packets and forward to the communications application 33 the information contained in the received packets.

According to the invention, the transceiver of FIG. 3 is provided with a MSD controller 35 which provides control signals to the packet processor 31 and the wireless communications interface 32 in response to received MSD parameters. The MSD controller 35 receives the MSD parameters via a switching unit 36 which is selectively controllable to forward to the MSD controller 35 either local MSD parameters produced by a MSD parameter generator 34, or remote MSD parameters received from another transceiver via the wireless communications link 39. These remote MSD parameters are provided by the packet processor 31 to an input 27 of the switching unit 36.

The switching unit 36 is controlled by a plurality of control signals, namely a local request signal output from the communications application 33, a remote request signal output from the packet processor 31, and a MSD done signal output from the MSD controller 35. The communications application 33 can output the local request signal, for example, when a large data burst (for example, as described above) is to be transmitted, or when it is desired to free some time slots for other communication activities, or when information which has a high quality-of-service requirement is to be transmitted. The remote request signal is produced by the packet processor 31 when remote MSD parameters are received from another transceiver. Thus, either of a pair of communicating transceivers can select the MSD mode of operation. When the remote request is active, the switching unit 36 is operable to forward the remote MSD parameters from input 27 to the MSD controller 35. When the local request is active, the switching unit 36 is operable to forward the local MSD parameters from input 26 to MSD controller 35. When the MSD done signal is active, the switching unit 36 is operable to assume the "neutral" position 25, from which no MSD parameters are applied to the MSD controller 35.

In response to activation of the local request signal, the MSD parameter generator 34 determines the local MSD parameters, namely the MSD frequency at which the transceivers will dwell, the starting time of the frequency dwelling, the duration of the frequency dwelling (see $T_i$ in FIGS. 1–2), and the data transmission method that will be used during the MSD period. The MSD frequency is selected on the basis of frequency quality information received from the wireless communications interface 32. Such quality information is conventionally available in wireless communication devices such as Bluetooth devices, and the MSD parameter generator 34 can maintain a list of the best frequencies based on the most recent quality measurements available for those frequencies. Examples of such quality measures include Bluetooth sync word correlation values, RSSI (received signal strength indicator), valid HEC (header error check), valid CRC (cyclic redundancy check), and SNR (signal-to-noise ratio). The MSD starting time can be determined, for example, based on the MSD frequency that has been selected, because it is known from the normal frequency hopping pattern when the selected MSD frequency will next be used and therefore available for frequency dwelling operation. In some embodiments, a frequency which is not the best available frequency may be selected for MSD because, for example, it is available in the normal frequency hopping pattern substantially earlier than is the best available frequency. The MSD duration parameter can be determined based on information included in the local request from the communications application 33, for example, based on: the size of a large upcoming data burst; the number of other communication transceivers that will be communicated with during time slots which are to be freed in the manner shown in FIG. 2 above; or the amount of information which is to be transmitted with an increased quality of service.

The local MSD parameters produced by the MSD parameter generator 34 are provided to the packet processor 31 to be included in an outgoing packet to the other transceiver which is to participate in the MSD operation. The local request signal can also be provided to the packet processor 31 in order to inform the packet processor that the local MSD parameters will be forthcoming for transmission to the other transceiver.

When another transceiver initiates the MSD operation, the packet processor 31 identifies in a received packet the remote MSD parameters produced by the initiating transceiver. When the remote MSD parameters have been identified, the packet processor 31 produces the remote request signal, which controls the switching unit 36 into position 27 such that the remote MSD parameters are provided from the packet processor 31 to the MSD controller 35.

The MSD controller 35 receives either the local MSD parameters associated with a local MSD request, or the remote MSD parameters associated with a remote MSD request, and provides control signals at 37 and 38 to the packet processor 31 and the wireless communication interface 32 in response to the received MSD parameters. These control signals illustrated at 37 and 38 can effectuate the desired MSD operation, for example increasing the data transmission rate, freeing time slots which are otherwise unavailable, or increasing the quality of service.

Figure 4:
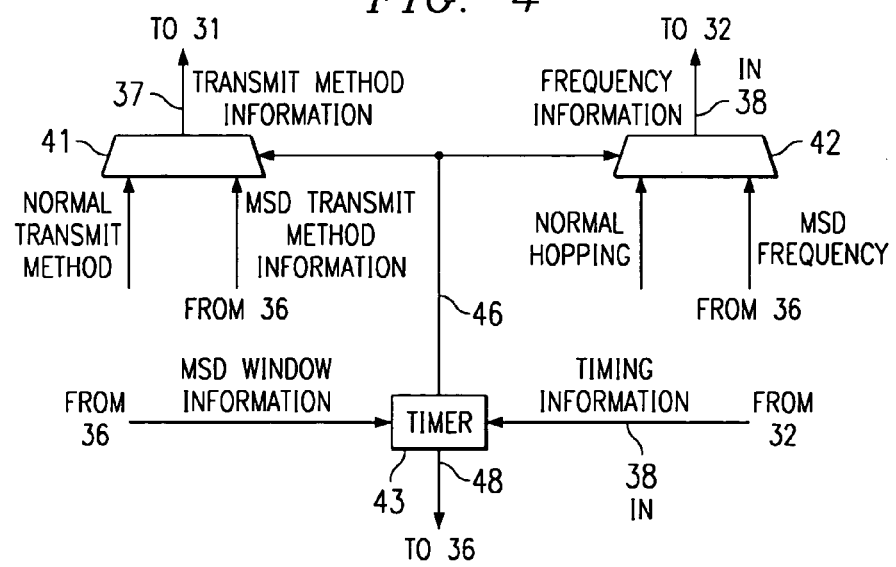
FIG. 4 diagrammatically illustrates an exemplary embodiment of the MSD controller of FIG. 3.

FIG. 4 diagrammatically illustrates exemplary embodiments of the MSD controller 35 of FIG. 3. The embodiment of FIG. 4 includes a timer 43 having an output 46 coupled to control the respective select inputs of selectors 41 and 42. The output of selector 41 corresponds to the control signal 37 illustrated in FIG. 3, and the output of selector 42 corresponds to one of the control signals shown at 38 in FIG. 3. The output of selector 41 provides to the packet processor 31 information indicative of the data transmission method, for example the coding rate and/or packet length, to be used. The output of selector 42 provides to the wireless communications interface 32 information indicative of the frequency that is to be used for data transmission and reception via the wireless communication link 39.

The timer 43 receives from the switching unit 36 information indicative of the MSD starting time and the MSD duration, together indicated as MSD window information in FIG. 4. This MSD window information indicates when MSD operation will occur. The timer 43 also receives from the wireless communications interface 32 conventionally available timing information, for example information indicative of the sequential occurrence of the time slots and normal frequency hops in the wireless communication link 39. When the timer 43 determines from the received timing information that the MSD starting time has arrived, the output 46 of the timer 43 becomes active and controls the selector 41 such that the MSD transmission method information, for example the coding rate and/or the packet length, received from the switching unit 36 is provided to the packet processor 31, and also controls the selector 42 such that the MSD frequency received from the switching unit 36 is provided to the wireless communications interface 32. The output 46 of timer 43 maintains the selectors 41 and 42 in the aforementioned states until the timer 43 determines from the timing information that the MSD period has expired, at which time the output 46 becomes inactive such that selectors 41 and 42 are switched, whereby the packet processor 31 is informed that the normal (non-MSD) transmission method is to be used, and the wireless communications interface 32 is informed that the normal frequency hopping sequence is to be used.

The timer 43 also includes an output 48 that corresponds to the MSD done signal of FIG. 3. In some embodiments, while the timer output 46 is active, the output 48 is inactive, so the MSD done signal has no effect on the operation of switching unit 36, but when the timer output 46 becomes inactive, the output 48 becomes active, so the switching unit 36 responds by assuming the "neutral" position 25. Thereafter, if a local request is received, then the switching unit 36 assumes position 26, and if a remote request is received, then the switching unit assumes position 27.

Because of government regulations that limit the duration of frequency dwell times, execution of a large data transfer will often require more than one MSD period. In such cases, the timer 43 and selector 42 can continue to receive updated MSD parameters that specify new MSD window information and new MSD frequencies in order to permit completion of the data transfer using a plurality of periods of MSD operation. In such cases, the timer output 46 can continue to operate the selectors 41 and 42 as described above for each individual MSD period of the data transfer, but the output 48 does not drive switching unit 36 (FIG. 3) to position 25 until all of the MSD periods specified by the MSD parameters have occurred (and thus the data transfer has been completed).

Figure 5:
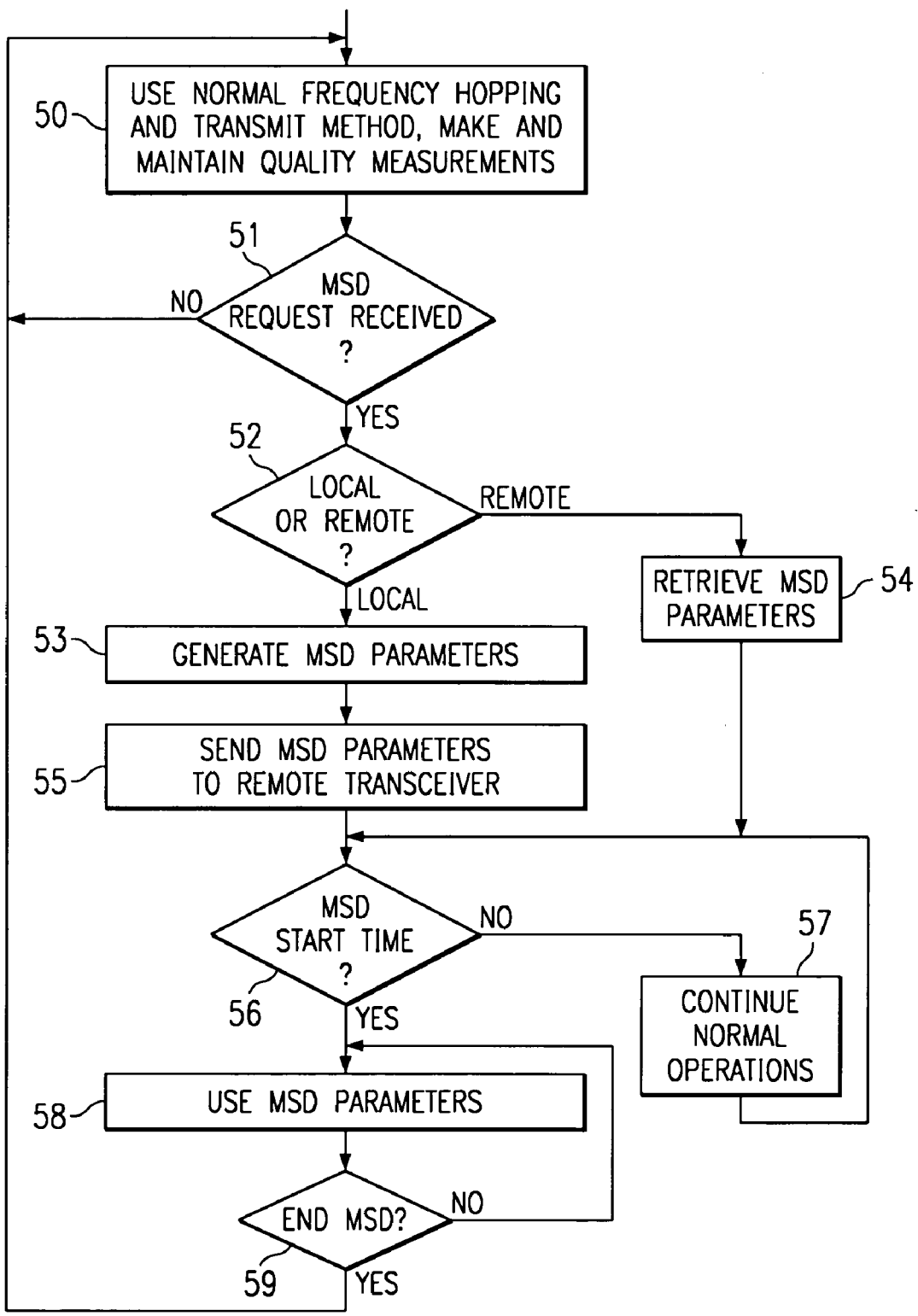
FIG. 5 illustrates exemplary operations which can be performed by the wireless communication transceiver of FIGS. 3 and 4.

FIG. 5 illustrates exemplary operations which can be performed by the embodiments of FIGS. 3 and 4. As shown at 50 and 51, the normal hopping frequency pattern and the normal data transmission method are used, while also making and maintaining frequency quality measurements, until a MSD request is received. When a MSD request is received at 51, it is determined at 52 whether the request is a local request or a remote request. If the request is a local request, then the local MSD parameters, including MSD start time and duration, MSD frequency and MSD transmit method (e.g., coding rate and/or packet length) are generated at 53. Thereafter, the local MSD parameters are sent to the remote transceiver. If the request is a remote request at 52, then the remote MSD parameters are obtained at 54. After either the remote MSD parameters have been obtained at 54 or the local MSD parameters have been generated and sent to the remote transceiver at 53 and 55, it is determined at 56 whether or not the MSD start time has arrived. If not, then the normal hopping frequency pattern and the normal data transmission method are continued at 57 until it is determined at 56 that the MSD start time has arrived. Thereafter at 58, the MSD frequency and the MSD data transmission method are used at 58 (either to transmit or receive) until it is determined at 59 that the period of MSD operation is completed. Thereafter, the aforementioned operations at 50–59 are repeated.

FIG. 6 illustrates exemplary operations which can be performed by the embodiments of FIGS. 3 and 4 when, for example, during large data transfers, a plurality of periods of MSD operation are necessary to complete the data transfer. As shown in FIG. 6, proceeding from the yes (Y) branch of operation 59 in FIG. 5, it is determined at 61 whether another period of MSD operation is needed. If so, operations return to 56 in FIG. 5, and if not, operations return to 50 in FIG. 5.

As can be seen from the foregoing description of FIGS. 3–6, the transceiver embodiment of FIG. 3 can transmit during the above-described frequency dwelling operations to a receiving transceiver having, for example, generally the same features described above with respect to FIGS. 3–6.

The table of FIG. 7 illustrates examples of how the present invention can alter the data transmission method during periods of MSD operation. As shown in FIG. 7, for a large data transfer, Bluetooth DH5 packets can be sent during an appropriate MSD period (or periods), and Bluetooth DM3 packets can be transmitted otherwise (non-MSD). Alternatively, Bluetooth DH3 packets or Bluetooth DM5 packets can be sent during MSD operation, and Bluetooth DM3 packets can be sent otherwise. If additional communication activity is desired (and assuming for this example a voice application), Bluetooth HV2 packets can be transmitted during an appropriate MSD period, and Bluetooth HV1 packets can be transmitted otherwise (non-MSD).

If an enhanced quality-of-service (QoS) is required, the transmission method can be the same during MSD operation and otherwise, as shown in FIG. 7. Thus, in instances where the MSD request is made in order to obtain an enhanced quality-of-service, the MSD parameter generator 34 of FIG. 3 provides to the packet processor 31 (via switching unit 36 and the selector 41 of FIG. 4) information which indicates that there is no change in the coding rate or the packet length during the MSD period, and which further indicates that certain information which the packet processor 31 has previously received from the communications application 33, namely the information which requires the higher quality of service, is now to be transmitted. All information which requires the enhanced quality of service can be tagged accordingly by the communications application 33 when it is provided therefrom to the packet processor 31, whereby the packet processor 31 can buffer (see 30 in FIG. 3) and later easily identify this information for transmission during MSD operation. As indicated above, although the data transmission method does not change in this example, the quality of service associated with the transmitted packets can be expected to improve because the transceivers are using a frequency which is currently known to provide good quality.

As mentioned above, the quality of service can be increased even more by lowering the coding rate during MSD operation, as shown at the bottom of FIG. 7.

The above-described tagging and buffering of information provided by the communications application 33 is also applicable to the use of MSD for transmission of large data bursts. Thus, when the packet processor 31 receives from selector 41 instructions to change the data transmission method, the packet processor can then retrieve the buffered information and send it out according to the indicated data transmission method.

An example of the above-described retrieval of previously tagged and buffered information for transmission during MSD operation is shown in FIG. 8. The operations of FIG. 8 can, as shown, be performed as part of operation 58 in FIG. 5. Continuing from the "yes" (Y) branch of operation 56 in FIG. 5, the previously tagged and buffered information is retrieved at 81 and transmitted according to the indicated data transmission method until operation 59 in FIG. 5 indicates that the MSD period has expired.

Taking the Bluetooth protocol as an example, the above-described MSD parameters can be transmitted in Bluetooth packets by, for example, substituting the MSD parameters for existing packet information or adding the MSD parameter bits after the header.

It will be evident to workers in the art that the embodiments of FIGS. 2–7 can be implemented, for example, by suitable modifications in software, hardware, or a combination of both software and hardware, in conventional wireless communication transceivers that utilize frequency hopping techniques, for example Bluetooth masters and slaves.

Although exemplary embodiments of the invention are described above in detail, this does not limit the scope of the invention, which can be practiced in a variety of embodiments.

What is claimed is:

1. A method of controlling wireless communication between first and second frequency hopping wireless communication devices, comprising:
   selecting a frequency hopping pattern comprising of a plurality of frequencies having respective time slots;
   the first device transmitting first data to the second device via a wireless communication link using a first data transmission rate and frequencies specified by the frequency hopping pattern;
   based on a selected criterion, selecting a single frequency from the frequency hopping pattern;
   the first device transmitting second data to the second device via the wireless communication link on said single selected frequency during a time slot corresponding to another frequency specified by the frequency hopping pattern for transmissions from the first device to the second device during a period of time; and
   said step of transmitting second data including the first device transmitting the second data to the second device using a second data transmission rate that is different than said first data transmission rate.

2. The method of claim 1, including the second device transmitting to the first device on said single frequency during said period of time instead of on a frequency specified by the frequency hopping pattern for transmissions from the second device to the first device during said period of time.

3. The method of claim 1, wherein said second data includes at least a portion of one of a data file, a digitized image, a digitized voice communication and an Internet web page.

4. The method of claim 1, wherein said step of transmitting second data to the second device using a second data transmission rate includes the first device transmitting the second data to the second device using a coding rate that is higher than a coding rate associated with the first data transmission rate.

5. The method of claim 1, wherein said step of transmitting second data to the second device using a second data transmission rate includes the first device transmitting the second data to the second device using a packet length that is longer than a packet length associated with the first data transmission rate.

6. The method of claim 5, wherein said step of transmitting second data to the second device using a second data transmission rate includes the first device transmitting the second data to the second device using a coding rate that is higher than a coding rate associated with the first data transmission rate.

7. The method of claim 1, wherein said step of transmitting second data includes the first device transmitting during said period of time an amount of information that is equal to an amount of information that could have been transmitted by the first device during said period of time using said first data transmission rate, whereby a portion of said period of time is made available for at least another wireless communication involving one of the first and second devices.

8. The method of claim 1, wherein the first and second devices are one and the other, respectively, of a Bluetooth master device and a Bluetooth slave device.

9. The method of claim 1, including the first device transmitting to the second device via the wireless communication link information indicative of said single frequency, said period of time, and the second data transmission rate.

10. The method of claim 1, wherein said second data requires a higher quality of service than does said first data, and wherein said second data transmission rate is lower than said first data transmission rate.

11. The method of claim 1, wherein the selected criterion is a frequency quality criterion.

12. A method of controlling wireless communication between first and second frequency hopping wireless communication devices, comprising:
   selecting a frequency hopping pattern comprising of a plurality of frequencies having respective time slots;
   the first device transmitting first data to the second device via a wireless communication link using frequencies specified by the frequency hopping pattern;
   providing second data for transmission from the first device to the second device;
   based on a selected criterion, selecting a single frequency from the frequency hopping pattern;
   based on a characteristic of the second data, the first device transmitting the second data to the second device via the wireless communication link on the single selected frequency during a time slot corresponding to another frequency specified by the frequency hopping pattern for transmissions from the first device to the second device during a period of time.

13. The method of claim 12, wherein said step of transmitting second data includes the first device using, for transmission of the second data, a data transmission rate that is different than a data transmission rate used by the first device for transmission of the first data.

14. The method of claim 12, including the second device transmitting to the first device via the wireless communication link on said single frequency during said period of time instead of on a frequency specified by the frequency hopping pattern for transmissions from the second device to the first device during said period of time.

15. The method of claim 12, wherein said characteristic of said second data is that said second data requires a higher quality-of-service than does said first data.

16. The method of claim 12, wherein said characteristic of said second data is that said second data includes at least a portion of one of a data file, a digitized image and an Internet web page.

17. The method of claim 12, including the first device transmitting to the second device via the wireless communication link information indicative of said single frequency and said period of time.

18. The method of claim 12, wherein said first and second devices are one and the other, respectively, of a Bluetooth master device and a Bluetooth slave device.

19. The method of claim 12, wherein the selected criterion is a frequency quality criterion.

20. A frequency hopping wireless communication apparatus, comprising:
 a wireless communication interface for transmitting first data to a further frequency hopping wireless communication apparatus via a wireless communication link using a first data transmission rate and frequencies specified by a frequency hopping pattern, the frequency hopping pattern comprising a plurality of frequencies having respective time slots;
 a controller coupled to said wireless communication interface for instructing said wireless communication interface to transmit second data to the further apparatus via the wireless communication link on a single selected frequency during a time slot corresponding to another frequency specified by the frequency hopping pattern for transmission from said wireless communication interface to the further apparatus during a period of time, said single selected frequency selected from the frequency hopping pattern based on a selected criterion; and
 said controller further for selecting a second data transmission rate for transmission of the second data during said period of time, wherein said second data transmission rate is different than said first data transmission rate.

21. The apparatus of claim 20, wherein said controller is operable for selecting for transmission of the second data at least one of a coding rate that is higher than a coding rate associated with the first data transmission rate and a packet length that is longer than a packet length associated with the first data transmission rate.

22. The apparatus of claim 20, wherein said wireless communication interface is responsive to said controller for transmitting during said period of time an amount of information that is equal to an amount of information that could have been transmitted by said wireless communication interface during said period of time using said first data transmission rate, whereby a portion of said period of time is made available for at least another wireless communication involving one of said wireless communication interface and the further apparatus.

23. The apparatus of claim 20, including a parameter generator coupled to said controller for producing information indicative of said single frequency, said period of time and the second data transmission rate and providing said information to said controller.

24. The apparatus of claim 23, wherein said parameter generator is coupled to said wireless communication interface for providing said information to said wireless communication interface for transmission via the wireless communication link to the further apparatus.

25. The apparatus of claim 20, wherein said second data includes at least a portion of one of a data file, a digitized image, a digitized voice communication and an Internet web page.

26. The apparatus of claim 20, provided as one of a Bluetooth master device and a Bluetooth slave device.

27. The apparatus of claim 20, wherein said second data requires a higher quality of service than does said first data, and wherein said second data transmission rate is lower than said first data transmission rate.

28. The apparatus of claim 20, wherein the selected criterion is a frequency quality criterion.

29. A frequency hopping wireless communication apparatus, comprising:
 a wireless communication interface for transmitting first data to a further frequency hopping wireless communication apparatus via a wireless communication link using frequencies specified by a frequency hopping pattern, the frequency hopping pattern comprising a plurality of frequencies having respective time slots;
 an input for receiving information indicative of a characteristic of second data to be transmitted by said wireless communication interface to the further apparatus; and
 a controller coupled to said input and to said wireless communication interface, said controller operable based on said characteristic for instructing said wireless communication interface to transmit the second data to the further apparatus via the wireless communication link on a single selected frequency during a time slot corresponding to another frequency specified by the frequency hopping pattern for transmissions from said wireless communication interface to the further apparatus during a period of time, said single selected frequency selected from the frequency hopping pattern based on a selected criterion.

30. The apparatus of claim 29, wherein said controller is further operable for selecting a second data transmission rate for transmission of the second data during said period of time, wherein said second data transmission rate is different than a data transmission rate used for transmission of the first data.

31. The apparatus of claim 29, wherein said characteristic of said second data is that said second data requires a higher quality-of-service than does said first data.

32. The apparatus of claim 29, wherein said characteristic of said second data is that said second data includes at least a portion of one of a data file, a digitized image and an Internet web page.

33. The apparatus of claim 29, including a parameter generator connected between said input and said controller for producing information indicative of said single frequency and said period of time and providing said information to said controller.

34. The apparatus of claim 33, wherein said parameter generator is coupled to said wireless communication interface for providing said information to said wireless communication interface for transmission via the wireless communication link to the further apparatus.

35. The apparatus of claim 29, provided as one of a Bluetooth master device and a Bluetooth slave device.

36. The apparatus of claim 26, wherein the selected criterion is a frequency quality criterion.

* * * * *